June 16, 1942. C. M. HINES 2,286,681
WHEEL SLIP CONTROL APPARATUS
Filed May 28, 1941
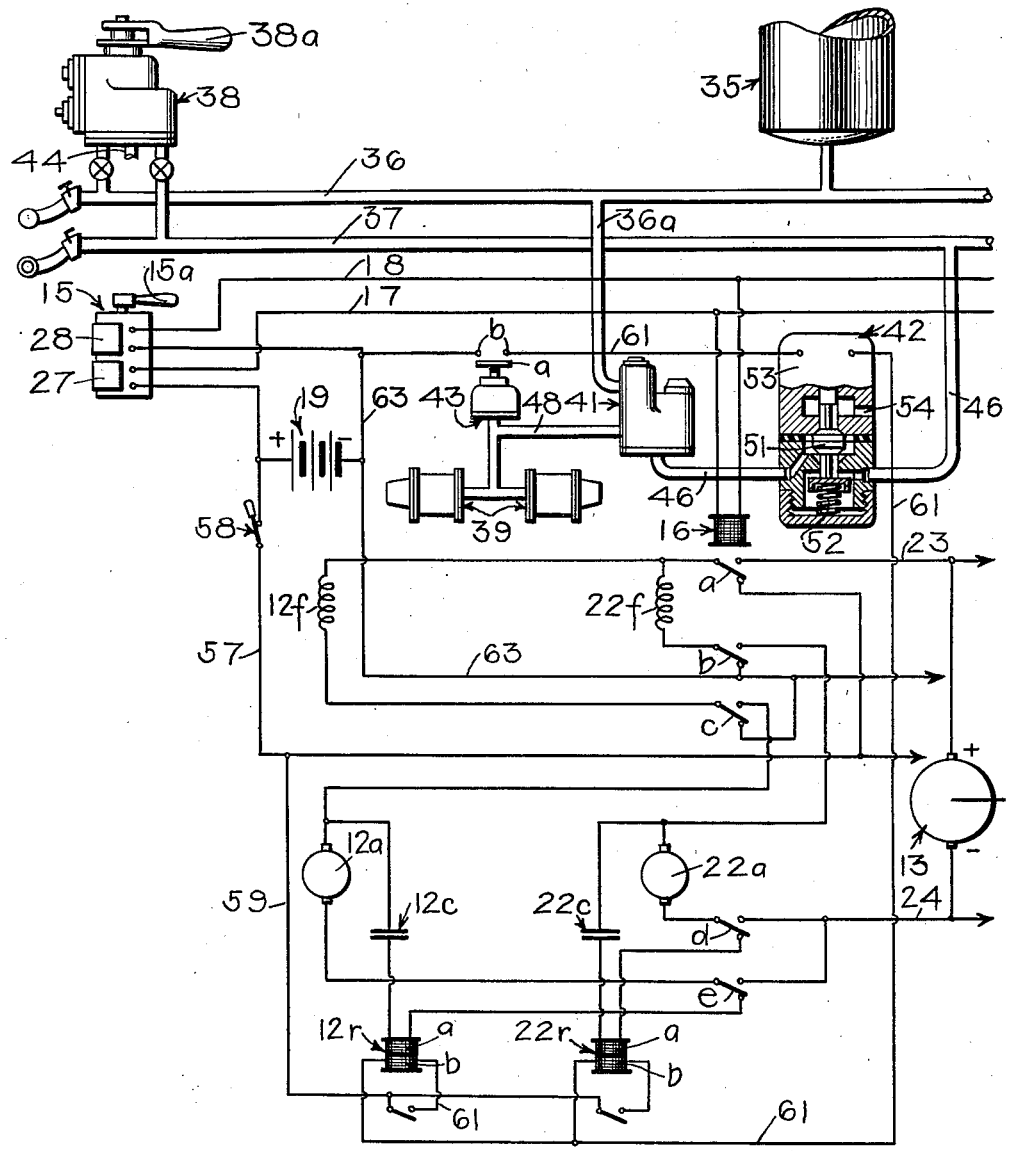
INVENTOR
CLAUDE. M. HINES
BY 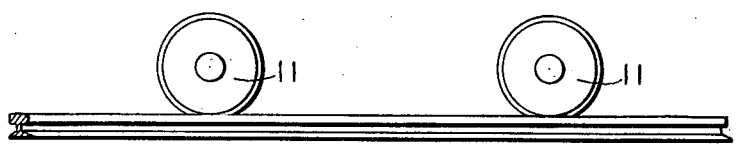
ATTORNEY Patented June 16, 1942

2,286,681

UNITED STATES PATENT OFFICE 2,286,681

WHEEL SLIP CONTROL APPARATUS

Claude M. Hines, Pittsburgh, Pa., assignor to The Westinghouse Air Brake Company, Wilmerding, Pa., a corporation of Pennsylvania Application May 28, 1941, Serial No. 395,530

2 Claims. (Cl. 303—21)

This invention relates to wheel slip control apparatus, that is, control apparatus operatively responsive to the slipping of a vehicle wheel for effecting a desired function such as the instantaneous and rapid release of the brakes to prevent the sliding of the wheels.

The terms "slip" and "slide," as used with reference to a vehicle wheel herein, are not synonymous. The term "slip" refers to the rotation of a vehicle wheel at a speed less than a speed corresponding to vehicle speed at a given instant, occurring when the braking force applied to a vehicle wheel exceeds the limit of the rolling friction or adhesion between the wheel and the rail on which it rolls. The term "slide" refers to the dragging of a vehicle wheel along a rail, in a locked or non-rotative condition, after having decelerated to the locked condition due to brake application.

It has been demonstrated that sliding of car wheels due to brake applications may be prevented by providing a device which detects or recognizes the slipping of the wheel for instantly and rapidly releasing the brakes associated with the slipping wheel. By releasing the brakes on a slipping wheel rapidly enough, the wheel ceases to decelerate and begins to accelerate back toward a speed corresponding to vehicle speed without actually decelerating to a locked condition and sliding.

Various types of devices both mechanical and electrical have been provided for the purpose of detecting the slipping condition of a vehicle wheel. In my prior Patent 2,208,738 I have provided an electrical type of apparatus for detecting the slipping condition of a vehicle wheel which comprises a generator driven according to the rotational speed of a wheel-and-axle assembly and adapted to supply a voltage substantially proportional to the rotational speed of the assembly, the voltage supplied by the generator being delivered to a circuit containing an electrical condenser and a winding of a relay in series relation. The current supplied to charge the condenser in response to an increase in generator voltage is directly proportional to the rate of acceleration of the wheel-and-axle assembly. Conversely, current discharged from the condenser upon a reduction of the generator voltage is substantially proportional to the rate of deceleration of the wheel. The winding of the relay is so designed as to respond to a current exceeding a certain value and corresponding to a rate of deceleration of the car wheels which never occurs unless the wheels slip.

The apparatus disclosed in my prior Patent 2,208,738 is adapted to be applied to a railway car or similar vehicle of either the self-propulsion or trailing type.

According to my present invention, I propose to provide wheel slip detecting apparatus adapted particularly for vehicles of the self-propulsion type and to this end I employ the propulsion motors of a railway car or similar vehicle in substitution for the separate axle-driven generators of my prior patent.

More specifically, it is an object of my invention to provide a vehicle brake and motor control system in which the propulsion motors of the vehicle are adapted to serve as a part of the means for detecting the rate of change of speed of the vehicle wheels for a desired purpose, such as the control of the brakes to prevent sliding of the wheels.

It is a further object of my invention to provide a vehicle brake and motor control system including means for coordinating the operation of the propulsion motors of the vehicle in such a manner as to serve to propel the vehicle at one time and to serve as a part of the wheel slip detecting apparatus at another time.

The above objects, and other objects of my invention which will be made apparent hereinafter, are attained by means of an illustrative embodiment of my invention shown in diagrammatic form in the accompanying single figure of the drawing and subsequently to be described.

Description of equipment

Referring to the drawing, my invention is illustrated in connection with a single four-wheel truck having the usual two pairs of wheel-and-axle assemblies, each assembly comprising a pair of wheels 11 (only one of which is visible in the drawing) fixed at opposite ends of an axle.

Each wheel-and-axle assembly is adapted to be driven by an electric motor in any suitable manner, the armature winding and field winding of the one motor being designated 12a and 12f respectively and the armature winding and field winding of the other motor being designated 22a and 22f respectively. It will be understood that, as shown, the armature and field winding of a motor are in vertical alignment with the wheel-and-axle assembly driven thereby.

Electric power for driving the motors may be provided from an external source through a trolley wire or third rail; or, as shown in the drawing, from a generator 13 on the vehicle itself driven by a suitable engine (not shown) of either a steam or internal-combustion type.

Suitable control apparatus for the propulsion motors is provided. For simplicity the control apparatus is shown as including a manually operated propulsion controller 15 which, in turn, controls one or more contactors 16, only one being shown. It will be understood that conventional motor control apparatus is intended to be employed although for purposes of this invention the simplified apparatus is deemed sufficient.

The winding of the contactor 16 is connected across a pair of control wires 17 and 18 respectively. With the propulsion controller handle 15a in its power-off (coasting) position as shown, the control wires 17 and 18 are disconnected from a suitable source of energy, such as a storage battery 19, and consequently the contacts of the contactor 16 are restored to their respective dropped-out positions.

When the propulsion controller handle 15a is shifted into the propulsion zone, suitable connections are made through contact segments 27 and 28 respectively of the controller whereby to impress the voltage of the battery 19 on the wires 17 and 18 and cause the contacts of the contactor 16 to be actuated to their respective picked-up positions.

Contactor 16 is provided with five contacts designated a, b, c, d, and e, respectively.

When the contacts of the contactor 16 are actuated to their respective picked-up positions, they are effective to establish connections for connecting the armature and field windings of the two propulsion motors in series-parallel relationship across two bus wires 23 and 24, hereinafter respectively referred to as the positive and negative bus wires, respectively connected to the positive and negative terminals of the generator 13.

With the contactor 16 in its picked-up position, current is thus supplied from the generator 13 to energize the propulsion motors so as to drive the car. For simplicity I have omitted all except the essential circuit relationships, but as previously indicated conventional type of motor control apparatus is intended to be employed.

The circuits for supplying current from the generator 13 to drive the propulsion motors may be traced from the positive terminal of the generator 13 to the positive bus wire 23, then by way of the contact a of the contactor 16 where the circuit divides into two parallel branches; the one branch extending by way of the field winding 12f, contact c of the contactor 16, armature winding 12a, and contact e of the contactor 16 to the negative bus wire 24; the other branch extending by way of the field winding 22f, contact b of the contactor 16, armature winding 22a, and contact d of the contactor 16 to the negative bus wire 24; and thence to the negative terminal of the generator 13.

According to my invention, the contacts a, b and c of the contactor 16 are effective in their respective dropped-out positions to automatically disconnect the motors from the bus wires 23 and 24 and cause the field windings 12f and 22f to be energized from the battery 19. At the same time, the contact e of the contactor 16 is effective in its dropped-out position to establish a local circuit across the terminals of armature winding 12a including an electrical condenser 12c and one of the windings a of a double coil relay 12r. In a similar manner, the contact d of the contactor 16 is effective in its dropped-out position to establish local circuit across the terminals of the armature winding 22a including an electrical condenser 22c and the winding a of a double-coil relay 22r.

With the motor field windings 12f and 22f energized from the storage battery 19, the voltage generated in the motor armature windings 12a and 22a is substantially proportional to the rotational speed of the corresponding wheel-and-axle assembly. By providing a suitable winding a for the relays 12r and 22r, as well as condensers 12c and 22c of suitable capacity, the relays may be made responsive only to condenser charging or discharging currents exceeding a certain value and corresponding to certain rates of acceleration or deceleration of the corresponding wheel-and-axle assemblies.

As shown, relays 12r and 22r have two windings, one of which is the winding a previously referred to, and the other of which is designated the winding b. The winding b of these relays functions as a holding winding to maintain the contact of the relay in its picked-up position once it is picked-up by suitable energization of winding a. The operation of these relays will be explained hereinafter.

The relays 12r and 22r may be arranged to effect merely a signal indication of wheel-slip or rate of acceleration and deceleration of the heels, or they may be adapted as shown to cause an automatic reduction in the degree of application of the brakes associated with the wheels of the truck in response to slipping of the wheels.

I have shown a simplified form of fluid pressure brake control apparatus to illustrate the manner in which the relays 12r and 22r may be effective in the control of brakes to prevent the sliding of the wheels. It will be understood, however, that the brake control system shown is merely illustrative and that any suitable type of fluid pressure brake control apparatus may be employed.

As shown, the fluid pressure brake equipment is of a simple straight-air type and comprises a main reservoir 35; two train pipes 36 and 37, hereinafter designated the supply pipe and control pipe respectively; a manually operated brake valve 38 of well known self-lapping type; one or more brake cylinders 39, two being shown for purposes of illustration; a relay valve device 41 for effecting the supply of fluid under pressure to the brake cylinders 39 from the supply pipe 36 and the release of fluid under pressure from the brake cylinders in accordance with the variation of pressure in the control pipe 37; a magnet valve device 42 for controlling communication between the control pipe 37 and the relay valve device 41; and a pressure-responsive switch device 43.

The brake valve 38 shown is of the well-known self-lapping type described in detail and claimed in Patent 2,042,112 to E. K. Lynn and Rankin J. Bush. Briefly, the brake valve 38 comprises a handle 38a which is effective in its normal or brake release position to cause fluid under pressure to be released to atmosphere from the control pipe 37 through an exhaust port and pipe 44 at the brake valve. When the brake valve handle 38a is shifted in a horizontal plane out of the brake release position into its application zone, fluid under pressure is supplied from the supply pipe 36 to the control pipe 37, the pressure established in the control pipe 37 being substantially proportional to the degree of displacement of the handle out of its brake release position.

If the pressure in the control pipe 37 tends to reduce for any reason, such as leakage, the brake valve 38 is effective to automatically continue the supply of fluid under pressure to the control pipe to maintain a pressure therein corresponding to the displacement of the brake valve handle out of its brake release position. This pressure-maintaining feature of the brake valve will be referred to hereinafter in connection with an assumed operation of the equipment.

The relay valve device 41 is of the well-known type described and claimed in Patent 2,096,491 to E. E. Hewitt. Since reference may be had to this patent for a detailed description of the relay valve device, only a brief description thereof will be given herein. The relay valve device comprises suitable supply and release valves of the self-lapping type controlled automatically according to the relation of the pressure in the brake cylinders 39 and the pressure of the fluid supplied from the control pipe 37 through a branch pipe 46 to a control chamber of the relay valve device.

The relay valve device 41 is effective to cause fluid under pressure to be supplied from a branch pipe 36a of the supply pipe 36 to a pipe 48 leading to the brake cylinders 39, in response to an increase in the pressure of the fluid supplied through the pipe 46. When the pressure in the brake cylinders 39 is built-up to a predetermined relation with respect to the pressure in the control pipe 37, such as substantial equality therewith, the relay valve mechanism is automatically lapped to prevent the further supply of fluid under pressure to the brake cylinders. Thus the pressure of the fluid established in the brake cylinders 39 corresponds substantially to and varied with the pressure in the control pipe 37.

The magnet valve 42 is of the conventional double-beat type having a casing containing a double-beat valve 51 which is normally biased to an upper seated position by a spring 52 and which is actuated to a lower seated position upon energization of a magnet or electromagnet winding 53.

In its upper seated position, the double-beat valve 51 establishes communication through the pipe 46 from the control pipe 37 to the control chamber of relay valve device 41 in a manner readily apparent. When the magnet winding 53 is energized and the double-beat valve 51 is actuated to its lower seated position, the supply communication through pipe 46 is interrupted and an exhaust communication to atmosphere is established from the section of the pipe 46 connected to the control chamber of relay valve 41, fluid under pressure being exhausted through an exhaust port 54 of the magnet valve 42.

The pressure switch 43 is of the snap-acting type described in Patent 2,096,492 to E. E. Hewitt. Briefly, the pressure switch comprises a movable contact a which is normally biased to a position out of contact with a pair of associated fixed contacts b as long as the pressure in the brake cylinders 39 is less than a certain pressure, such as five pounds per square inch. When the pressure in the brake cylinders 39 increases above this pressure, the contact a is snapped into engagement with the stationary contacts b. Whenever the pressure in the brake cylinders reduces again below five pounds per square inch, the contact a is snapped out of engagement with the contact b to its open position shown. The purpose of the pressure switch will be explained presently.

*Operation of equipment*

Let it be assumed that the car is traveling along the road under power with the handle 15a of the propulsion controller 15 in propulsion position and the brake valve handle 38a in brake release position. In such case, therefore, the contacts of the contactor 16 are actuated to their respective picked-up positions to establish the previously traced circuits for supplying propulsion current to the motors from the generator 13 and, at the same time, fluid under pressure is released from the brake cylinders 39 so that the brakes are released.

Let it now be assumed that the operator desires to apply the brakes to bring the car to a stop. He first restores the handle 15a of the propulsion controller to its power-off (coasting) position, thereby deenergizing the control wires 17 and 18 and causing the contacts of contactor 16 to be restored to their respective dropped-out positions. As previously described, the field windings 12f and 22f are thus energized from the storage battery 19 and the local condenser and relay circuit associated with the armature windings 12 and 22a is established.

After the handle 15a of the propulsion controller 15 is restored to its power-off position, the operator shifts the brake valve handle 38a into its application zone an amount corresponding to a desired degree of application of the brakes. The control pipe 37 is accordingly charged to a pressure corresponding to the position of the brake valve handle, such as forty pounds per square inch, and at the same time fluid under pressure flows from the control pipe through the pipe 46 to the control chamber of the relay valve device 41. Relay valve device 41 in turn operates in response to the fluid pressure established in the control chamber thereof to supply fluid under pressure from the supply pipe 36 and branch pipe 36a to the pipe 48 and connected brake cylinders 39, the pressure established in the brake cylinders corresponding to or having a certain desired ratio to the pressure established in the control pipe 37. The brakes are accordingly applied to the wheel-and-axle assemblies of the truck and the car is accordingly decelerated.

The contact a of the pressure switch 43 is snapped to its closed position engaging the associated contacts b when the pressure in the brake cylinders 39 increases above five pounds per square inch. However, such operation is without effect unless one or the other or both of the relays 12r and 22r are picked-up in response to slipping of one or the other or both of the wheel-and-axle assemblies.

If the wheels of the truck do not slip during a brake application, no variation of the pressure supplied to the brake cylinders occurs except under the control of the operator who may, by suitably increasing or decreasing the pressure in the control pipe 36, increase or decrease the degree of application of the brakes as desired.

If during an application of the brakes, the wheels of one of the wheel-and-axle assemblies such as the left-hand assembly begin to slip, then the corresponding relay 12r is picked-up. The contact of relay 12r is effective when picked-up to establish a circuit for energizing the magnet winding 53 of the magnet valve 42 and, at the same time, a self-holding circuit including the holding winding b of the corresponding relay. This circuit extends from the positive terminal of battery 19 by way of a positive battery wire 57 including a switch 58 the purpose of which will be explained presently, a branch wire 59, the contact of the relay 12r, a wire 61 including the winding B of the relay 12r, the winding 53 of the magnet valve 42 and the closed pressure switch 43, and by way of a negative battery wire 63 to the negative terminal of the battery 19.

It will be apparent, therefore, that once the contact of the relay 12r is actuated to its picked-up or closed position it is maintained thereafter in such position as long as the pressure switch 43 remains closed.

Upon energization of the magnet winding 53 of the magnet valve 42 in response to the pickup of the relay 12r, the supply of fluid under pressure to the control chamber of relay valve device 41 from the control pipe 37 is interrupted and fluid under pressure is exhausted from the control chamber through the exhaust port 54 of the magnet valve 42 at a rapid rate. The relay valve device 41 correspondingly operates to vent fluid under pressure from the brake cylinders 39 at a corresponding rapid rate.

Due to the self-holding circuit of the relay 12r, the fact that the slipping wheels may cease to decelerate and begin to accelerate back toward a speed corresponding to car speed does not affect the circuit for energizing the magnet winding of the magnet valve 42.

When the pressure in the brake cylinders 39 reduces below five pounds per square inch, the pressure switch 43 is restored to its normal open position, thereby interrupting the self-holding circuit for the relay 12r, and at the same time, the circuit for energizing the magnet winding 53 of the magnet valve 42. The contact of the relay 12r is accordingly restored to its dropped-out or open position and the magnet valve 42 is restored to its normal position reestablishing communication through the pipe 46 from the control pipe 37 to the control chamber of the relay valve device 41. Thus fluid under pressure is again supplied from the control pipe 37 to the control chamber of relay valve device 41 which operates to again cause fluid under pressure to be supplied to the brake cylinders 39 to effect reapplication of the brakes.

The resupply of fluid under pressure from control pipe 37 to the control chamber of the relay valve device 41 tends to reduce the pressure in the control pipe. Due to the pressure-maintaining feature of the brake valve 38, however, fluid under pressure is automatically supplied to the control pipe to maintain a pressure therein corresponding to brake valve handle position.

The time required for the pressure in the brake cylinders to be reduced to below five pounds per square inch and sufficiently to cause the pressure switch 43 to be restored to its open position is ordinarily longer than the time required for the slipping wheels to be restored fully to a speed corresponding to car speed. Reapplication of the brakes on the wheels is thus automatically prevented until the wheels are restored fully to a speed corresponding to car speed. The likelihood of the wheels decelerating to a locked condition and sliding is thus reduced.

It will be seen that if slipping of the wheels of the right-hand wheel-and-axle assembly occurs during a brake application, the magnet winding of the magnet valve 42 is likewise energized and the brakes on the truck likewise released in the manner previously described. Such is the case because the contact of the relay 22r is in parallel with the contact of the relay 12r.

It will be apparent, upon analysis, that when the car comes to a complete stop, fluid under pressure is always reestablished in the brake cylinders 39 in accordance with the pressure of the fluid established in the control pipe 37. Thus the brakes remain applied while the car is stopped.

In order to release the brakes prior to again starting the car, the operator merely shifts the brake valve handle 38a to its brake release position. The pressure in the control pipe 37 is accordingly exhausted to atmosphere through exhaust port 44 at the brake valve and the relay valve device 41 correspondingly operates to vent fluid under pressure from the brake cylinders 39 to thereby effect the complete release of the brakes.

If the car is stopped for any length of time, for example as when being stored over night, the switch 58 may be operated to its open position for the purpose of interrupting the supply of current from battery 19 to the motor field windings 12f and 22f because such current consumption is unnecessary. The switch 58 may be located in any convenient location so that the operator of the vehicle may readily open the switch upon leaving the car and reclose it upon re-entering the car.

*Summary*

Summarizing, it will be seen that I have disclosed a brake and propulsion control system for a vehicle, such as a railway car, including means for automatically conditioning the propulsion motors as generators in a wheel-slip detecting apparatus provided for a desired purpose such as the automatic release of the brakes to prevent sliding of the wheels during braking.

While I have shown and described my invention in connection with a single car truck, the manner in which the control apparatus of my invention may be employed in controlling the brakes and motors of other trucks on a single car or on other cars of a train will be readily apparent.

Having now described my invention, what I claim as new and desire to secure by Letters Patent, is:

1. In a vehicle of the type having a propulsion motor for driving a wheel of the vehicle and brake means associated with the wheel arranged to be applied and released under the control of the operator of the vehicle, the combination of means under the control of the operator for causing the propulsion motor to act as a generator and supply a voltage substantially proportional to the rotational speed of the wheel driven by the motor, current-responsive means, means for causing said current-responsive means to be energized by a current which is substantially proportional to the rate of change of voltage supplied by the motor acting as a generator, said current-responsive means being operatively responsive only to a current exceeding a certain value occurring only when the said wheel rotatively decelerates at a rate exceeding a certain slipping rate and means effective upon operation of the current-responsive means to effect a rapid reduction in the degree of application of the brakes associated with the wheel.

2. In a vehicle of the type having a propulsion motor, including an armature winding and a field winding, for driving a wheel of the vehicle and brake means that is applied to said wheel and released under the control of the operator, the combination of means under the control of the operator of the vehicle for effecting separate excitation of the said field winding of said motor in a manner to cause a voltage to be generated in the armature winding of the motor substantially proportional to the rotational speed of the wheel driven by the motor, a circuit subject to the voltage generated in the armature winding, an electrical condenser in said circuit charged according to the voltage generated in the armature winding of the motor and effective to discharge a current in said circuit substantially proportional to the rate of reduction of the voltage, and current-responsive means operatively responsive only to a current in said circuit exceeding a certain value occurring only when the wheel rotatively decelerates at a slipping rate for effecting a rapid reduction in the degree of application of the brakes associated with said wheel.

CLAUDE M. HINES.